3,125,498
METHOD OF UPGRADING LIGHT HYDROCARBONS
William Bartok, Cranford, and Peter J. Lucchesi, North Plainfield, N.J., assignors to Esso Research and Engineering Company, a corporation of Delaware
No Drawing. Filed Apr. 24, 1959, Ser. No. 808,552
8 Claims. (Cl. 204—154)

This invention relates to the radiation conversion of light hydrocarbon and more particularly to the production of higher molecular weight branched-chain hydrocarbons by the reaction of light paraffinic hydrocarbons with an alkylene in the presence of high energy ionizing radiation. The products are extremely useful for upgrading refinery gases and light virgin naphtha to high octane gasoline components.

In commercial operations petroleum refineries have large quantities of light hydrocarbon mixtures available. Recently there has sprung up a great demand for branched-chain hydrocarbons making it necessary to incorporate new facilities in the ordinary refinery in order to obtain increased amounts of such materials which serve not only as blending agents for the straight-chain paraffins but also as intermediates and reactants in the preparation of normally liquid hydrocarbons which are useful as motor fuels. Often for such purposes particular alkylation products are necessary.

Generally conversion of saturated-unsaturated hydrocarbon mixtures has been carried out in the presence of various alkylation catalysts, promoters, and activators, and complicated separation and recovery processes have been required to obtain the desired alkylation product. In ordinary chemistry the condensation reaction between light paraffins and olefins has been studied in some detail. Heretofore, however, it has not been possible to successfully bring about the condensation reaction between light paraffins and alkynes. At temperatures where initiation of reaction is rapid, the decomposition and polymerization of the alkyne has been so extensive that no paraffin-alkyne reaction has been observed.

The present invention provides a novel hydrocarbon condensation process which obviates these and other disadvantages of the prior art methods for reacting paraffin hydrocarbons with alkynes. In brief, this invention involves a process for upgrading hydrocarbons which comprises subjecting a paraffin hydrocarbon having from 2 to 5 carbon atoms per molecule in the presence of an alkyne to a total absorbed dosage in the range of $10^3$ to $10^9$ rads of high energy ionizing radiation equivalent to at least 100 electron volts. In a preferred process, acetylene or propyne (methyl acetylene) is present in an amount which is in the range of 1 to 50 mole percent based on the total amount of paraffin and alkyne present. Condensation is carried out at a temperature in the range of 100° to 400° C. at a pressure in the range of 10 to 55 atmospheres.

While free radical alkylation of paraffins with feed olefin has been one of the promising ways of making branched hydrocarbons for use in high octane fuel, "alkylation" using alkynes has never been achieved by the conventional commercial process. It has now been discovered that at temperatures and pressures required to initiate the thermal reaction between light paraffin hydrocarbons and acetylene the decomposition and polymerization of acetylene are so rapid that no paraffin-alkyne reaction is observed. Surprisingly, however, in the presence of ionizing radiation the condensation reaction proceeds with high selectivity. While the direct alkylation of alkynes with light paraffins, according to this invention, is not fully understood at this time, it is believed that the radiation-induced reaction may be a chain process peculiar to radiation with no thermal counterpart. At present no firm decision can be made whether it is a radical reaction or a chain process peculiar to the radiation initiation technique.

Broadly, any paraffin, that is, any saturated aliphatic hydrocarbon having two or more carbon atoms can be reacted with an alkyne according to the present invention. Particularly, the process is applicable for the conversion of paraffin hydrocarbons having from two to five carbon atoms with acetylene or methyl acetylene. Mixtures of two or more of these hydrocarbons can also be reacted in accordance with this invention.

Various refinery gases such as ethane, propane, $C_4$ and $C_5$ cuts from thermal or catalytic cracking units, field butanes which have been subjected to prior isomerization or partial dehydrogenation treatments, and spent gases and liquid products from catalytic polymerization processes, are also useful as feed stocks for the present invention. It is only essential that the feed stocks to the process contain at least one paraffinic hydrocarbon and also contain an initial concentration of an alkyne present in an amount between 1 and 50 mole percent based on the total content of paraffin and alkyne in the feed. By the irradiation of the paraffin alone one cannot achieve a novel result of this invention.

Particularly advantageous for the present process is a refinery hydrocarbon feed boiling at a temperature in the range of from about 10° to 200° F. containing at least 75 weight percent of a paraffin-acetylene mixture wherein the concentration of acetylene is equal to that given above. Furthermore, the presence of hydrogen is not deleterious to the reaction; therefore, an unpurified refinery gas stream is suitable for use in the reaction.

As has already been stated, it is desirable to employ a substantial molar excess of the paraffinic component of the feed stock. Further, according to this invention, acetylene in amounts in the range of about 1 to 50 mole percent is added to a feed comprising a paraffin and the mixture is exposed to high energy ionizing radiation of an intensity and for a duration sufficient to convert at least one percent based on total feed of the paraffin. The radiolysis of the feed mixture is carried out by exposing it either continuously or batchwise to the radiation. The unconverted constituents can then be returned to the reaction zone in an ordinary recycle process.

Most advantageously the process of the instant invention is carried out in the vapor phase. For vapor phase condensation in the presence of high energy ionizing radiation the reaction occurs in a temperature range of 100° to 400° C. at a pressure between about 10 to 55 atmospheres. Most preferably the condensation of paraffins with an alkyne is carried out at a temperature between about 200° and 320° C. at a pressure in the range of 10 to 15 atmospheres.

Specifically, the novel condensation reaction of the present invention is carried out by exposing the paraffin hydrocarbon or a mixture of paraffin hydrocarbons in contact with small amounts of acetylene to high energy ionizing radiation equivalent to at least 100 electron volts. Types of radiation suitable for the purposes of invention include high energy electromagnetic radiation such as gamma and X-rays, high velocity electrons, as well as beta rays and alpha particles, protons, deuterons, fission fragments and neutrons. These types of radiations can be supplied by conventional sources, such as radioactive materials, nuclear machines, or by common neutron sources. Fission by-products of processes generating atomic power or fissionable materials which emit high energy gamma rays also afford highly desirable and most abundant source of radioactivity suitable for the purposes of the invention. The by-products include those with atomic numbers ranging from 30 to 63 and their compounds. They are formed in the course of converting uranium and thorium and other feasible materials in an atomic reactor.

In one embodiment of this invention, the irradiation with gamma rays and neutrons can be carried out most conveniently, particularly on a commercial scale, by employing an atomic pile, that is, a nuclear reactor. This particular source of radiation can be utilized on either a batch or a continuous basis. More specifically, for example, a batch reaction can be carried out simply by irradiating the material in a container. In carrying out a continuous process, the material to be irradiated can be pumped through pipes disposed in the atomic pile. Generally the radiation from an atomic pile will consist primarily of neutrons and gamma rays. The neutron flux existing in these piles generally will be in the range of about $10^{11}$ to $10^{14}$ neutron per centimeter squared per second and the gamma ray dosage will generally be from about $10^4$ to $10^8$ roentgens per hour. Total radiation dose rates in the range of $10^5$ to $10^9$ rads per hour are employed. In some cases the feed stream itself will serve as a moderator.

Materials made radioactive by exposure to neutron radiation such as radioactive cobalt 60 can likewise be used with radiation fields in the range of 0.1 to $10^7$ rads per hour. Suitable sources of high velocity electrons are beams of electron accelerators such as the Van de Graaff electrostatic accelerator, resonant transformers and linear accelerators. For example, radiation intensities of the order of $4 \times 10^6$ rads per second are obtained with these electron beams.

Preferably high velocity electrons, high energy gamma rays and neutrons are preferred for the purposes of the present invention, mainly because of the high penetrating power of the rays and the availability and ease of application of these sources of high energy ionizing radiation. The radiation condensation process can be carried out utilizing the wide radiation dose range. Preferably, the total dosage absorbed by the reactant feed will be in the range of $10^3$ to $10^9$ rads. Most advantageously total dosage in the range of $10^5$ to $10^8$ rads is employed.

No special type of apparatus is required for carrying out the novel condensation process of this invention. The usual alkylation equipment has been found to be entirely satisfactory. The acetylene component added to the paraffinic feed can be controlled in order to obtain high yields of conversion product. The amount to be added is determined in any convenient manner as by observing the composition, distribution, or yield, of the products, or by monitoring the admixture entering the radiation reaction zone. This can be done by continuous analysis; for example, by continuously measuring the product quality or continuously measuring the acetylene composition of the feed mixture.

In one embodiment of the present invention a paraffin-acetylene mixture is exposed to high energy ionizing radiation in a radiation zone using a conventional radiation source. For example, this source can comprise an atomic pile or nuclear reactor and the mixture can simply be passed through in suitable condutis. It can flow around or through the core of the reactor and in some cases the hydrocarbon mixture itself can serve as a moderator. Suitable conditions of pressure and temperature are maintained during the alkylation. The converted material is removed to a suitable product separation zone which can comprise for example a distillation zone, several flash vaporization chambers, a solvent extraction zone, an absorption zone, or a combination of any of these. Following the removal of the desired products the unreacted paraffin and acetylene are recovered and can be recycled to the feed stream.

To fully illustrate the invention the following example is presented.

EXAMPLE 1

Irradiations were performed in a static system using a cylindrical reactor vessel made from stainless steel. A nine inch long reaction vessel which had a volume of 1.01 liters was enclosed in an aluminum jacket. The reactor was heated electrically with the electrical and thermocouple leads housed in a long aluminum pipe welded to the top of the jacket. This reactor was immersed in a "swimming pool" nuclear reactor at distances of 10 and 20 centimeters from the core face. The bottom of the reactor was held in a holder on a radiation table designed for positioning the equipment inside the reactor. In the 10 centimeter position a total radiation dosage of 48 megarads per hour was absorbed by the feed. In the 20 centimeter position 17 megarads per hour was absorbed.

Mixtures of a light paraffin and acetylene were admitted into the reactor through a long feed line which reached down to the bottom of the reactor along its vertical axis. The same line served for product withdrawal at the conclusion of each irradiation. The feed-product line was heated to prevent condensation. Feed mixtures were prepared by admitting the required amounts of Matheson instrument grade paraffin and acetylene into an evacuated 34 liter stainless steel tank. The mixtures were charged from the feed tank to the reactor vessel to a specified pressure which was always below the dew point of the mixture. A reactor system of the same construction was employed in the study of surface effects, the surface/volume ratio was increased from 0.59 cm.$^{-1}$ for the empty reactor to 394 cm.$^{-1}$ by packing it with 200 mesh stainless steel wire cloth.

The product gas was collected at room temperature in an evacuated stainless steel tank by opening a valve to the reactor vessel until the pressures equalized. A gas meter was used for measuring the product remaining in the system after sample collection. The products were analyzed by conventional gas chromatography. Silica gel, and 2,5-hexanedione on fire brick were employed for column packing. Some samples were analyzed by mass spectrometry and infra-red absorption. These tests showed good agreement with the chromatographic analysis. The unpacked reactor was burned out with air at about 1000° F. and atmospheric pressure to determine how much of the carbon feed was deposited in the reactor. The low value of the carbon feed which was recovered by the burn-out provided evidence for the lack of polymerization of the hydrocarbons by the process.

The highest flux available from the pool type nuclear reactor was of the order of $3 \times 10^{12}$ thermal neutrons/sec./cm.$^2$ and $10^{12}$ fast neutrons/cm.$^2$/sec. The rate of radiation energy absorption at the two pool positions was determined by the use of methane as a chemical dosimeter. The principle of this technique consists of the radiating samples of pure methane for fixed time intervals followed by the measurement of the hydrogen yield due to irradiation. For calculating the rate of energy absorption, the G value of 5.7 molecules of hydrogen per 100 e.v. was used. This has been shown to be independent of temperature and pressure. At the two positions which were studied in the swimming pool reactor energy absorption rates in methane of $7 \times 10^7$ rads per hour and $2 \times 10^7$ rads per hour were measured. Results are illustrated in Tables I, II and III for propane-acetylene mixtures.

Table I
UNPACKED REACTOR

| Run | Feed[a] | Run Conditions | | | | | Conversion, Wt. Percent | | Product Selectivity, Wt. Percent of Feed Reacted | | | | | | | |
|---|---|---|---|---|---|---|---|---|---|---|---|---|---|---|---|---|
| | | Temp., °F. | Pressure, p.s.i.a. | Dose Rate[b] | Time, Thermal | Minutes Radiation | $C_2^-$ or $C_2^≡$ | Total Feed | $C_1 + C_2$ | $C_2^-$ | $C_3^-$ | i-$C_4$ | n-$C_4$ | $C_4^-$ | i-$C_5$ | $C_5^-$ |
| 1 | 1 | 485 | 108 | 1 | 16 | 15 | 19.4 | 0.6 | 19 | 23 | 14 | Tr | | | | 44 |
| 2 | 1 | 685 | 180 | 1 | 13 | 15 | 98 | 1.67 | 25 | 30 | 19 | | | | | 26 |
| 3 | 1 | 790 | 195 | 1 | 13 | 15 | 99 | 2.79 | 57 | 20 | 18 | Tr | | 4 | | |
| 4 | 1 | 790 | 195 | 1 | 13 | 5 | 97 | 1.56 | 44 | 36 | 16 | Tr | | 4 | | |
| 5 | 1 | 490 | 150 | 2 | 14 | 40 | 28 | 0.93 | 17 | 26 | 12 | | Tr | | | 45 |
| 6 | 1 | 790 | 195 | 2 | 13 | 40 | 98 | 2.92 | 57 | 18 | 17 | Tr | 2 | | 6 | |
| 7 | 1 | 485 | 150 | 2 | 15 | 120 | 60 | 2.01 | 18 | 24 | 12 | | | | | 46 |
| 8 | 1 | 685 | 180 | 2 | 11 | 40 | 97 | 1.86 | 20 | 37 | 16 | | Tr | | | 27 |
| 9 | 1 | 780 | 195 | 2 | 11 | 15 | 97 | 1.65 | 51 | 31 | 18 | | | | Tr | Tr |
| 10 | 1 | 500 | 150 | 1 | 16 | 45 | 56 | 2.26 | 19 | 25 | 13 | | 2 | | | 41 |
| 11 | 1 | 480 | 150 | | 60 | 0 | 3.4 | 0.35 | 88 | | 12 | | | | | |
| 12 | 1 | 635 | 180 | | 60 | 0 | 84 | 0.74 | 20 | 61 | 19 | | | | | |
| 13 | 1 | 790 | 190 | | 30 | 0 | 98 | 1.26 | 54 | 26 | 20 | | | | | |
| 14 | 1 | 790 | 200 | | 60 | 0 | 97 | 1.25 | 69 | 13.5 | 17.5 | | | | | |
| 15 | 1 | 595 | 155 | 1 | 8 | 15 | 35 | 1.06 | 16 | 27 | 15 | | | | | 42 |
| 16 | 2 | 790 | 195 | 1 | 10 | 40 | 100 | 7.10 | 62 | 12 | 14 | | 2 | 3 | 3 | 4 |
| 17 | 2 | 595 | 165 | 1 | 15 | 15 | 34 | 0.87 | 17 | 30 | 17 | | | | | 36 |
| 18 | 2 | 880 | 205 | | 60 | 0 | 100 | 7.8 | 79 | 2 | 6 | Tr | 12 | | 1 | |
| 19 | 3 | 395 | 165 | 2 | 18 | 120 | 51 | 1.76 | 20 | 20 | 11 | | | | | 49 |
| 20 | 3 | 390 | 165 | | 60 | 0 | 18 | 0.93 | 74 | 11 | 14 | | | | | |
| 21 | 4 | c 470 | 155 | 1 | 0 | 111 | 81 | 3.35 | 27 | 19 | 16 | Tr | Tr | 4 | 2 | 31 |
| 22 | 4 | c 290 | 115 | 2 | 0 | 180 | 50 | 2.14 | 28 | 22 | 14 | Tr | Tr | Tr | Tr | 36 |

[a] 1=8.66 $C_2H_2$+91.34 $C_3H_8$, 2=8.80 $C_2H_2$+91.20 $C_3H_8$, 3=8.83 $C_2H_2$+91.17 $C_3H_8$, 4=9.33 $C_2H_2$+90.67 $C_3H_8$. (All proportions are mole percent.)
[b] 1=17 megarads/hr., 2=48 megarads/hr.
[c] The temperature and pressure were time-average values. Reactor at 100–150° F. in radiation field.

Table II
PACKED REACTOR

| Run | Feed[a] | Run Conditions | | | | | Conversion, Wt. Percent | | Product Selectivity, Wt. Percent of Feed Reacted | | | | | | | |
|---|---|---|---|---|---|---|---|---|---|---|---|---|---|---|---|---|
| | | Temp., °F. | Pressure, p.s.i.a. | Dose Rate[b] | Time, Thermal | Minutes Radiation | $C_2^-$ or $C_2^≡$ | Total Feed | $C_1 + C_2$ | $C_2^-$ | $C_3^-$ | i-$C_4$ | n-$C_4$ | $C_4^-$ | i-$C_5$ | $C_5^-$ |
| 1 | 2 | 680 | 180 | 1 | 10 | 15 | 91 | 1.50 | 39 | 34 | 19 | | | 9 | | |
| 2 | 2 | 800 | 195 | 1 | 12 | 40 | 91 | 3.19 | 51 | 25 | 19 | | | 5 | | |
| 3 | 2 | 790 | 195 | | 60 | 0 | 91 | 1.05 | 74 | 6 | 20 | | | | | |
| 4 | 2 | 685 | 180 | 2 | 12 | 16 | 97 | 1.03 | 37 | 40 | 17 | | | 7 | | |
| 5 | 2 | 690 | 180 | 2 | 10 | 40 | 92 | 1.37 | 57 | 17 | 21 | | | 5 | | |
| 6 | 2 | 800 | 195 | 2 | 12 | 40 | 94 | 2.82 | 89 | 3 | 9 | | | | | |
| 7 | 3 | 495 | 160 | 2 | 18 | 40 | 42 | 0.85 | 15 | 27 | 14 | | | Tr | | 44 |
| 8 | 4 | 390 | 160 | 2 | 14 | 40 | 24 | 0.76 | 16 | 20 | 13 | | | Tr | | 51 |
| 9 | 4 | 600 | 175 | 2 | 15 | 40 | 88 | 1.53 | 18 | 47 | 14 | | | | | 20 |
| 10 | 4 | 500 | 165 | 1 | 18 | 15 | 35 | 0.82 | 17 | 32 | 13 | | | Tr | | 38 |
| 11 | 4 | 590 | 175 | 1 | 12 | 15 | 49 | 0.95 | 17 | 35 | 18 | | | Tr | | 31 |
| 12 | 4 | 600 | 175 | | 60 | 0 | 46 | 0.35 | 23 | 60 | 17 | | | Tr | | |
| 13 | 4 | 700 | 180 | | 30 | 0 | 91 | 0.72 | 28 | 57 | 15 | | | Tr | | |

[a] 1=8.66 $C_2H_2$+91.34 $C_3H_8$, 2=8.80 $C_2H_2$+91.20 $C_3H_8$, 3=8.83 $C_2H_2$+91.17 $C_3H_8$, 4=9.33 $C_2H_2$+90.67 $C_3H_8$. (All proportions are mole percent.)
[b] 1=10 cm. from core face to center line of reactor, 2=20 cm. from core face to center line of reactor.

Table III
RADIATION AND THERMAL CONVERSIONS OF ACETYLENE IN PROPANE-ACETYLENE MIXTURES

| Reactor Temperature, °F. | Conversion of Acetylene, Wt. Percent | | |
|---|---|---|---|
| | Radiation (45 Min.) + Thermal (15 Min.)[a] | Thermal, 60 Min.[a] | Radiation Alone, 45 Min. |
| 400 | 25 | 10 | 15 |
| 500 | 50 | 30 | 20 |
| 600 | 70 | 55 | 15 |
| 700 | 95 | 75 | 20 |

[a] Based on runs with feeds containing 8.7 to 9.3 mole percent acetylene. The packed and unpacked reactors at the low and high dose rates were used.

The above example clearly shows that the radiolysis of paraffin-acetylene mixtures in the vapor phase results in the production of a branched-chain higher molecular weight products with high selectivity and high radiation yields. In the range of 200 to 320° C. and 10 to 13 atmospheres total pressure the thermal alkylation between propane and acetylene was negligible. However, in the case of radiation induced reaction at temperatures of up to 320° C., 20 to 30% of the acetylene reacted with propane to give the addition product. At temperatures about 320° C. the thermal reaction of acetylene is so rapid that it tends to mask the radiation effect. At these temperatures there is no direct alkylation reaction. The experiments were repeated at the same conditions except that stainless steel packed reactors were used which allowed a 670-fold increase in surface area. In the low temperature region, 200 to 320° C., there was no detectable effect by increasing surface. As with the unpacked reactor the condensation depends primarily on temperature and time.

The surprising feature of the present invention is well illustrated by the above example. Thermally, no hydrocarbon having a molecular weight above propylene was detected in the reaction product gas, propane cracking and acetylene polymerization predominating. For the radiation runs, however, the results were quite different, as has been shown above. In the range of 200° to 300°

C., the selectivity of the reaction (weight percent of total reaction product) is as high as 50% to the propane-acetylene condensation product. This isopentene product analyzed exclusively as 3-methyl-1-butene. The complete absence of other pentene isomers in the product is quite unexpected. No products above $C_5$ were found, the only other products being methane, ethane, ethylene and propylene, all typical of non-chain radiolysis of propane. Thus, it is seen that essentially all the acetylene reacted through alkylation with propane. Material balance considerations tested this conclusion.

The data of the above experiment clearly indicate that the condensation of a light paraffin hydrocarbon with an alkyne greatly predominates over all other reactions under the conditions disclosed. The experiments demonstrate that the direct alkylation of acetylene with a light hydrocarbon is a new reaction with no thermal counterpart and that a high yield of branched hydrocarbon product can be obtained at temperatures low enough that excessive pressures are not needed. It is to be understood that the above-described arrangements in techniques are but illustrative of the application of the principles of this invention. Numerous other arrangements and procedures may be devised by those skilled in the art without departing from the spirit and scope of the invention.

What is claimed is:

1. A hydrocarbon upgrading process which comprises subjecting a paraffin hydrocarbon having from 2 to 5 carbon atoms per molecule, in the presence of an effective amount of acetylene and in the absence of catalyst, to a total absorbed dosage in the range of $10^3$ to $10^9$ rads of high energy ionizing radiation equivalent to at least 100 electron volts with a radiation dose rate in the range of $10^5$ to $10^9$ rads per hour, wherein the paraffin/acetylene mole ratio is in the range of 1:1 to 100:1, said paraffin hydrocarbon and acetylene being at a temperature in the range of about 100° to 400° C. and a total pressure in the range of 10 to 55 atmospheres during said ionizing radiation, and recovering a normally gaseous branched-chain olefin.

2. A hydrocarbon upgrading process which comprises subjecting a hydrocarbon mixture consisting essentially of acetylene and a paraffin hydrocarbon having from 2 to 5 carbon atoms per molecule, in the absence of catalyst, to a total absorbed dosage in the range of $10^3$ to $10^9$ rads of high energy ionizing radiation equivalent to at least 100 electron volts with a radiation dose rate in the range of $10^5$ to $10^9$ rads per hour, wherein the paraffin/acetylene mole ratio is in the range of 1:1 to 100:1, said acetylene and paraffin hydrocarbon being at a temperature in the range of about 100° to 400° C. and a total pressure in the range of 10 to 55 atmospheres during said ionizing radiation, and recovering a normally gaseous branched-chain olefin.

3. A hydrocarbon upgrading process which comprises subjecting a paraffin hydrocarbon having from 2 to 5 carbon atoms per molecule, in the presence of acetylene and in the absence of catalyst, to a total absorbed dosage in the range of $10^5$ to $10^8$ rads of high energy ionizing radiation equivalent to at least 100 electron volts with a radiation dose rate in the range of $10^5$ to $10^9$ rads per hour, said paraffin hydrocarbon and acetylene being at a temperature in the range of about 100° to 400° C. and at a total pressure in the range of 10 to 55 atmospheres and the paraffin/acetylene mole ratio being in the range of 1:1 to 100:1 during said ionizing radiation, and recovering a normally gaseous branched-chain olefin.

4. A hydrocarbon upgrading process which comprises subjecting a propane-acetylene mixture having a propane/acetylene mole ratio in the range of 1:1 to 100:1, in the absence of catalyst, to a total absorbed dosage in the range of $10^3$ to $10^9$ rads of high energy ionizing radiation equivalent to at least 100 electron volts with a radiation dose rate in the range of $10^5$ to $10^9$ rads per hour, said mixture being at a temperature in the range of about 100° to 400° C. and at a total pressure in the range of 10 to 55 atmospheres during said ionizing radiation, and recovering a normally gaseous isopentene product.

5. The process of claim 4 wherein said mixture is subjected to said ionizing radiation at a temperature in the range of 200° to 320° C.

6. A hydrocarbon upgrading process which comprises subjecting a paraffin hydrocarbon having from 2 to 5 carbon atoms per molecule, in the presence of an effective amount of acetylene and in the absence of catalyst, to a total absorbed dosage in the range of $10^3$ to $10^9$ rads of high energy ionizing radiation equivalent to at least 100 electron volts with a radiation dose rate in the range of $10^5$ to $10^9$ rads per hour, wherein said paraffin hydrocarbon and acetylene are in vapor phase and the paraffin/acetylene mole ratio is in the range of 1:1 to 100:1, and recovering a normally gaseous branched-chain olefin.

7. A hydrocarbon upgrading process which comprises subjecting a paraffin hydrocarbon having from 2 to 5 carbon atoms in the presence of acetylene and in the absence of catalyst, to a total absorbed dosage in the range of $10^5$ to $10^8$ rads of high energy ionizing radiation equivalent to at least 100 electron volts with a radiation dose rate in the range of $10^5$ to $10^9$ rads per hour, said paraffin hydrocarbon and acetylene being in vapor phase and the mole ratio of paraffin/acetylene being in the range of 1:1 to 100:1, and recovering a normally gaseous branched-chain olefin.

8. A hydrocarbon upgrading process which comprises subjecting a propane-acetylene vapor mixture having a propane/acetylene mole ratio in the range of 1:1 to 100:1, in the absence of catalyst, to a total absorbed dosage in the range of $10^5$ to $10^8$ rads of high energy ionizing radiation equivalent to at least 100 electron volts with a radiation dose rate in the range of $10^5$ to $10^9$ rads per hour, and recovering a normally gaseous isopentene product.

References Cited in the file of this patent

UNITED STATES PATENTS

| | | |
|---|---|---|
| 2,266,848 | Chappell | Dec. 23, 1941 |
| 2,276,189 | Grosse et al. | Mar. 10, 1942 |
| 2,872,396 | Wilson et al. | Feb. 3, 1959 |
| 3,008,886 | Sarantites | Nov. 14, 1961 |

FOREIGN PATENTS

| | | |
|---|---|---|
| 1,148,720 | France | June 24, 1957 |
| 309,002 | Great Britain | Apr. 2, 1929 |
| 665,263 | Great Britain | Jan. 23, 1952 |

OTHER REFERENCES

Bovey: Effects of Ionizing Radiation on Natural and Synthetic High Polymers (January 1958), pages 2 and 16.